United States Patent [19]

Meyer et al.

[11] 4,397,871

[45] Aug. 9, 1983

[54] AMUSEMENT DEVICE FOR TRANSMITTING MESSAGES

[75] Inventors: Burton C. Meyer, Downers Grove; Beth E. Luecke, Chicago, both of Ill.

[73] Assignee: Marvin Glass & Associates, Chicago, Ill.

[21] Appl. No.: 303,904

[22] Filed: Sep. 21, 1981

[51] Int. Cl.³ ............................................. A23G 3/30
[52] U.S. Cl. ..................................... 426/5; 426/104; 426/383; 46/1 R
[58] Field of Search ............... 426/3, 5, 89, 103, 104, 426/383; 46/1

[56] References Cited

U.S. PATENT DOCUMENTS

| | | | |
|---|---|---|---|
| 1,163,894 | 12/1915 | Conger | 426/383 |
| 2,353,594 | 7/1944 | Seagren | 426/104 |
| 3,052,552 | 9/1962 | Koerner | 426/383 |
| 3,851,075 | 11/1974 | Wisdom | 426/104 |
| 3,852,494 | 12/1974 | Williamson | 426/104 |
| 4,024,287 | 5/1977 | Golchert | 426/104 |
| 4,285,978 | 8/1981 | Quinlivan | 426/383 |

OTHER PUBLICATIONS

Websters New Collegiate Dictionary, G. & C. Merriam Co., Springfield, Mass. 1961, p. 125.

Primary Examiner—Jeanette M. Hunter

[57] ABSTRACT

A amusement device for transmitting secret messages includes a central, generally flat, elongated core member for receiving the imprinting of messages thereon. A pressure sensitive sheet-like transfer element is wrapped around or placed adjacent a portion of the core material. The transfer element is coated on the side adjacent the core member with a substance which will transfer to the core upon pressure being applied to the outer side. The amusement device further includes an inner and outer wrapper, wrapped around the core member and pressure sensitive transfer element to disguise the nature of the device. A message may be written on the core material by using a stylus or other non-marking item to apply pressure to the outside wrapper. The pressure sensitive transfer element will imprint the message onto the core material such that when the core member is unwrapped, the message may be read. In one embodiment of the amusement element, the core member is a stick of chewing gum and the transfer element is coated with an edible substance.

8 Claims, 4 Drawing Figures

U.S. Patent  Aug. 9, 1983  4,397,871
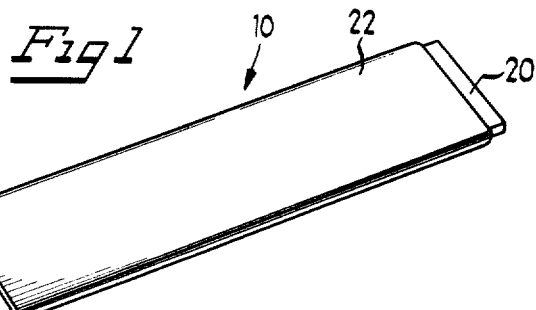
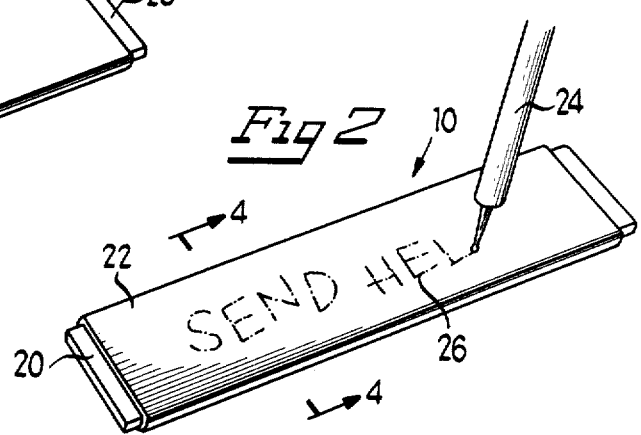
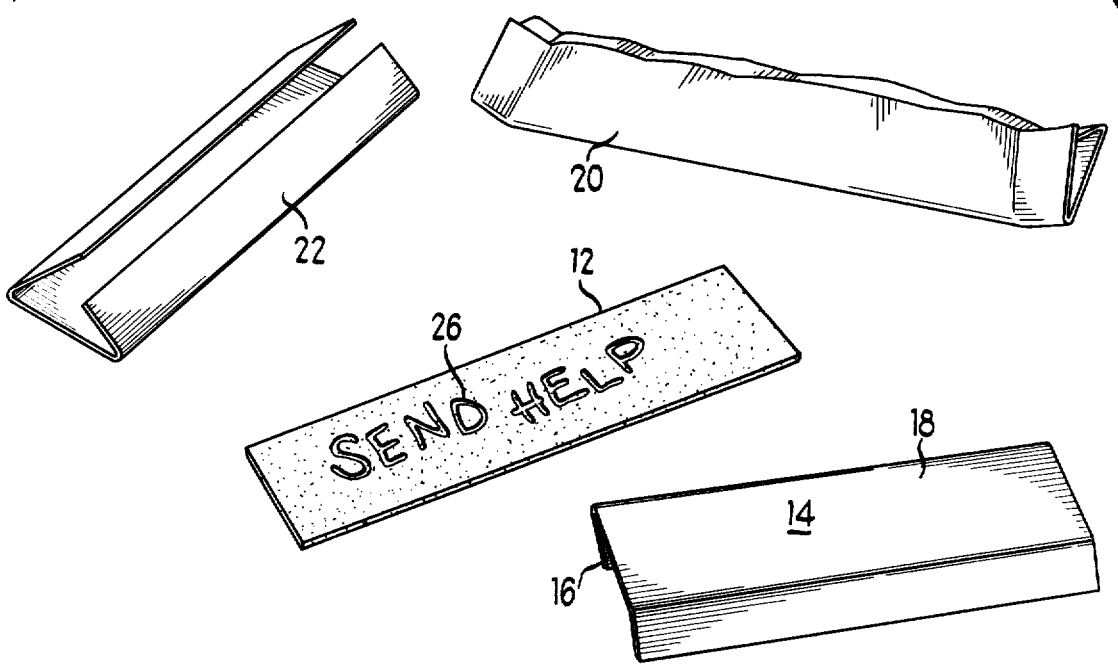
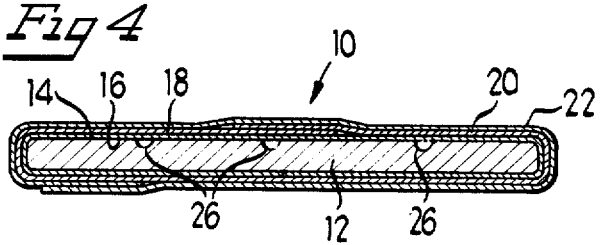

AMUSEMENT DEVICE FOR TRANSMITTING MESSAGES

BACKGROUND OF THE INVENTION

A. Field of the Invention

The present invention relates to amusement devices and in particular improved amusement devices for transmitting secret messages and the like.

B. Description of the Prior Art

Children and adults often play games wherein secret messages are transmitted to and from one another which cannot be read by those not aware of how the secret message has been transmitted. One well known prior art method of transmitting secret messages is to write with milk on a blank sheet of paper and this message cannot be read except by one who applies heat to the paper whereupon the written message becomes visible. As children get older and become aware of these prior art methods of transmitting messages, they can no longer be done in secret and new and different, more sophisticated ways of transmitting secret messages are desired.

SUMMARY OF THE INVENTION

An object of the present invention is to provide a new and improved amusement device for transmitting secret messages.

Another object of the present invention is to provide a new and improved amusement device that includes a core member on which a secret message may be written and a wrapper which covers the message while giving no indication of the message to observers.

The present invention is directed to a new and improved amusement device for transmitting secret messages. The toy includes a core member, that in the preferred embodiment, may be a stick of chewing gum. The core member is intended to have a message imprinted thereon which does not affect its subsequent use as chewing gum. A sheet coated with a pressure sensitive transfer substance is wrapped around the core member so that a message can be imprinted on the core member by applying pressure on the exterior of the transfer sheet which causes the transfer of a portion of the transfer substance to the core member. In the preferred form the transfer substance is edible, such that upon the application of pressure to the exterior of the transfer sheet, words or other messages are imprinted or transferred onto the gum without affecting its use as chewing gum.

Preferably the core member and the transfer sheet are both wrapped within an exterior wrapper or sleeve to further disguise the nature of the device. The sleeve may be etched by a stylus or similar non-marking item such that the wrapper will not indicate the prior application of the stylus to it. However, this pressure is applied through the sleeve to the pressure sensitive transfer sheet which causes the transfer of a portion of the edible transfer substance to the core thereby imprinting a message or the like onto the core member.

Through the use of this amusement device, a person may write a message that cannot be read by looking at the wrapper of the gum. Thereafter, the user may give the gum to a friend who upon unwrapping it, may read the message on the gum.

BRIEF DESCRIPTION OF THE DRAWING

The above and other objects and advantages and novel features of the present invention will become apparent from the following detailed description of a preferred embodiment of the invention illustrated in the accompanying drawing wherein:

FIG. 1 is a perspective view of an amusement device constructed in accordance with the principles of the present invention;

FIG. 2 is a view similar to FIG. 1 illustrating the application of pressure onto the amusement device to write a secret message;

FIG. 3 is an exploded, perspective view of the components of the amusement device of the present invention; and FIG. 4 is a view taken generally along line 4—4 of FIG. 2.

BRIEF DESCRIPTION OF THE PREFERRED EMBODIMENT

With reference to the figures and initially to FIG. 1, there is illustrated an amusement device generally designated by the reference numeral 10 constructed in accordance with the principles of the present invention. The amusement device 10 is intended to transmit secret messages or signals between the user without the messages being read by third parties.

As best illustrated in FIGS. 3 and 4, the amusement device 10 includes a core member 12, that in a preferred embodiment is an elongated rectangular stick of chewing gum. The core member 12 is wrapped by a sheet of pressure sensitive transfer material 14. The inner surface 16 of the transfer sheet contains a coating of edible substance, such as colored granulated sugar, that is transferred to the core 12 upon the application of pressure to the outer surface 18 of the transfer sheet. The selective pressure causes the edible substance to be transferred in only those areas where the pressure is applied so that a readable message may be applied such as the message "Send Help" 26 on the gum 12 of FIG. 3.

Since the core member 12 preferably is chewing gum or the like, it is preferred that the core member 12 be wrapped in a material that will preserve the freshness of the core material 12. To maintain freshness and sanitation, a foil wrapper 20 is wrapped around the core member 12 and the pressure sensitive transfer sheet and is folded over the ends so that the core material 12 or chewing gum is completely enveloped by the foil 20 thereby ensuring the preservation of freshness and sanitation. Finally, a wrapper 22 is wrapped around the foil 20, the pressure sensitive transfer sheet 14 and the core member 12 and may be either blank or preferably include indicia of the type indicating the type of chewing gum comprising the core member 12 and the name of the manufacturer.

As best illustrated in FIG. 2 a stylus 24 or other non-marking item is used to apply pressure to the wrapper 22 without leaving a mark on the wrapper 22. The application of pressure is transmitted through the wrapper 22 and the foil 20 to the pressure sensitive transfer sheet 14, so that the edible transfer substance is transferred onto the core member 12. For example, as best illustrated in FIGS. 2 and 3, the words "Send Help" 26 may be pressure applied to the wrapper 22 by the stylus 24. Since the stylus 24 is non-marking and simply applies pressure to the wrapper 22, no words are imprinted on the wrapper 22; however, through the application of pressure by the stylus 24 the words "Send Help" are imprinted onto the core member 12 from the transfer sheet 14 (FIG. 3). Thereafter, the user may give the stick of gum 10 to a friend and thereof transmit the message to him. To the casual observer watching this transfer, no message would be seen since no message would appear on the wrapper 22. The recipient may then unwrap the gum 12 and read the message imprinted thereon. The recipient may then chew the core member 12, if it is made of a material such as gum or the like, and thus the recipient would know the message that was sent and he would be able to destroy the message so that no third parties may read the message. The amusement device 10 provides a sophisticated and amusing means of transmitting a secret message using an ordinary object such as a stick of gum as the medium for transferring the message.

Other variations of the present invention may provide for a simpler construction. For example, the transfer substance 16 could be applied directly to the inner surface of the foil element 20 so that the sheet of transfer material 14 would not be necessary. Likewise, a combination of various coatings, one on the surface of the gum 12 and the other on the inner surface of the transfer sheet 14 could be combined by the pressure to change color or opaqueness to render a message visible on the surface of the gum 12. These constructions may be used by a gum manufacturer to package a group of the described devices in one package to be sold separately or as an element in a game apparatus. Depending upon the softness of the core member or gum 12, the pressure applied by the stylus or other instrument 24 may cause depressions in the surface that the pressure is applied to as shown in FIG. 4.

The foregoing detailed description has been given for clearness of understanding only and no unnecessary limitations should be understood therefrom as some modifications would be obvious to those skilled in the art.

What is claimed and sought to be covered by U.S. Letters Patent is:

1. An amusement device for transmitting a secret message, comprising:

an edible core member for receiving and displaying the secret message, and a wrapper of a pressure sensitive transfer sheet sealingly enveloping the core member, said wrapper having an inside surface in contact with the core member and an exposed outside surface, said inside surface of said wrapper having a portion generally uniformly coated with an edible pressure sensitive transfer substance adapted to transfer from said wrapper to the core member in a pattern corresponding to the pattern of application of pressure to the outside surface of said wrapper.

2. The amusement device of claim 1 wherein said wrapper includes a first folded sheet bearing said transfer substance, a second sheet for sealingly enclosing said first sheet and said core member and a third sheet enveloping said second sheet.

3. The amusement device of claim 1 wherein said core member is resilient.

4. The amusement device of claim 3 wherein said core member is chewing gum.

5. The amusement device of claim 1 wherein said edible transfer substance is granulated sugar.

6. An amusement method comprising the steps of:

providing a generally flat edible core member;

providing a wrapper of a pressure sensitive transfer sheet;

coating a portion of one surface of said wrapper generally uniformly with an edible transfer substance; and wrapping said wrapper seaingly around said core member so that a portion of said transfer substance can be applied to said core member in a pattern corresponding to the pattern of application of pressure to the exterior of said wrapper.

7. The method of claim 6 including the step of applying pressure in the pattern of written words to the exterior of said wrapper to print a message on said core member.

8. The method of claim 6 wherein the wrapping step includes the steps of enclosing said core member in a first sheet coated with the transfer substance, enclosing said first sheet within an air tight sealing sheet and enclosing said sealing sheet within a label sheet.

* * * * *